US012726983B2

(12) United States Patent
Li

(10) Patent No.: US 12,726,983 B2
(45) Date of Patent: Sep. 1, 2026

(54) DOWNLINK DATA RECEIVING METHOD AND DEVICE, DOWNLINK DATA TRANSMITTING METHOD AND DEVICE, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 268 days.

(21) Appl. No.: 18/776,152

(22) Filed: Jul. 17, 2024

(65) Prior Publication Data

US 2024/0381356 A1 Nov. 14, 2024

Related U.S. Application Data

(63) Continuation of application No. 17/421,374, filed as application No. PCT/CN2019/070847 on Jan. 8, 2019, now Pat. No. 12,069,657.

(51) Int. Cl.

*H04W 72/1273* (2023.01)
*H04W 72/044* (2023.01)
*H04W 72/23* (2023.01)

(52) U.S. Cl.

CPC ..... *H04W 72/1273* (2013.01); *H04W 72/046* (2013.01); *H04W 72/23* (2023.01)

(58) Field of Classification Search

None

See application file for complete search history.

(56) References Cited

U.S. PATENT DOCUMENTS

2018/0041319 A1 2/2018 Cheng et al.
2019/0239212 A1* 8/2019 Wang ................ H04B 7/06964

(Continued)

FOREIGN PATENT DOCUMENTS

CN 108023629 A 5/2018
CN 108024346 A 5/2018

(Continued)

OTHER PUBLICATIONS

JPOA issued in Application No. 2021-539021 dated Feb. 14, 2023 with English translation, (6p).

(Continued)

*Primary Examiner* — Peter P Chau

(74) *Attorney, Agent, or Firm* — Arch & Lake LLP

(57) ABSTRACT

A downlink data receiving method performed by a terminal includes: determining CORESET configuration information; receiving a first DCI carried by a first PDCCH sent by a base station through a first antenna panel in a plurality of antenna panels, wherein the first DCI is used to schedule the downlink data which is to be transmitted by the base station to the terminal; determining a second antenna panel used by the base station to transmit the downlink data, wherein the first antenna panel and the second antenna panel are the same antenna panel; and in response to a time interval between receiving the first DCI and the downlink data is less than a preset time period, determining a default receiving beam for receiving the downlink data, wherein the default receiving beam is a receiving beam used by the terminal for receiving a second PDCCH through the second antenna panel.

13 Claims, 5 Drawing Sheets

(56) References Cited

U.S. PATENT DOCUMENTS

| | | | | |
|---|---|---|---|---|
| 2020/0077283 | A1 | 3/2020 | Zhou et al. | |
| 2020/0112941 | A1* | 4/2020 | Yerramalli | H04L 12/189 |
| 2020/0288479 | A1 | 9/2020 | Xi et al. | |
| 2021/0083748 | A1 | 3/2021 | Guan et al. | |
| 2021/0127389 | A1 | 4/2021 | Liu et al. | |
| 2021/0409094 | A1* | 12/2021 | Yuan | H04B 7/06964 |

FOREIGN PATENT DOCUMENTS

| | | | |
|---|---|---|---|
| CN | 108199819 | A | 6/2018 |
| WO | 2017079544 | A1 | 5/2017 |

OTHER PUBLICATIONS

Mitsubishi Elctric: "Views on multi-beam operation," 3GPP TSG RAN WG1, Meeting #95, R1-1813384, Spokane, USA, Nov. 12-16, 2018, (7p).

InterDigital Inc., "DCI Design for Multi-TRP/Panel Transmission for DL," 3GPP TSG RAN WG1, Meeting #90, R1-1714138, Prague, Czech Republic, Aug. 21-25, 2017, (3p).

Extended European Search Report of EP Application No. 19908238.9 dated Jul. 12, 2022, (10p).

Intel Corporation, "Discussion on multi-TRP/multi-panel transmission," 3GPP TSG RAN WG1, Meeting #95, R1-1812509, Spokane, WA, Nov. 12-16, 2018, (13p).

International Search Report of PCT Application No. PCT/CN2019/070847 dated Sep. 26, 2019 with English translation, (4p).

* cited by examiner

DOWNLINK DATA RECEIVING METHOD AND DEVICE, DOWNLINK DATA TRANSMITTING METHOD AND DEVICE, AND STORAGE MEDIUM

CROSS-REFERENCE TO RELATED APPLICATIONS

This application is a continuation of U.S. patent application Ser. No. 17/421,374, filed on Jul. 7, 2021, which is the US national phase application of International Application No. PCT/CN2019/070847, filed on Jan. 8, 2019, the entire contents of which are incorporated herein by reference for all purposes.

TECHNICAL FIELD

The present disclosure relates to the field of communication technology, and particularly to a method and a device for transmitting downlink data, a method and a device for receiving downlink data, and a storage medium.

BACKGROUND

In a 5G NR (New Radio) system, base stations and terminals may use beams to transmit and receive messages. For example, control signaling and service data that interact between base stations and terminals may be transmitted and received using beams.

In the case that the base station has multiple antenna panels, the base station may transmit downlink data to the terminal respectively through different antenna panels, that is, transmit downlink data to the terminal respectively through different transmitting beams. At this time, the terminal cannot accurately determine which receiving beam is adopted to receive the downlink data sent by the base station, resulting in the terminal receiving downlink data in error.

SUMMARY

According to a first aspect of the present disclosure, a method for receiving downlink data is provided. The method includes: determining, by a terminal, control resource set (CORESET) configuration information, wherein the CORESET configuration information comprises identification information of an antenna panel using a CORESET for physical downlink control channel (PDCCH) transmission; receiving, by the terminal, a first downlink control information (DCI) carried by a first PDCCH sent by a base station through a first antenna panel in a plurality of antenna panels, wherein the first DCI is used to schedule the downlink data which is to be transmitted by the base station to the terminal; and determining, by the terminal, a second antenna panel used by the base station to transmit the downlink data, wherein the first antenna panel and the second antenna panel are the same antenna panel; wherein the terminal determines a target CORESET used for the first PDCCH; the terminal determines an antenna panel corresponding to the target CORESET as the first antenna panel used by the base station for transmitting the first PDCCH, according to the CORESET configuration information; and the terminal determines the first antenna panel as the second antenna panel; and in response to a time interval between receiving the first DCI and the downlink data is less than a preset time period, determining, by the terminal, a default receiving beam for receiving the downlink data, wherein the default receiving beam is a receiving beam used by the terminal for receiving a second PDCCH through the second antenna panel.

According to a second aspect of the present disclosure, a method for transmitting downlink data is provided. The method includes: determining, by a base station, CORESET configuration information, wherein the CORESET configuration information comprises identification information of an antenna panel using a CORESET for PDCCH transmission; transmitting, by the base station, the CORESET configuration information to a terminal, wherein the CORESET configuration information comprises identification information of an antenna panel using a CORESET for DCI transmission, so that the terminal determines a first antenna panel used by the base station to send a first PDCCH according to the CORESET configuration information and determines the first antenna panel as a second antenna panel; transmitting, by the base station, a first PDCCH through the first antenna panel of a plurality of antenna panels, wherein the first PDCCH carries a first DCI, the first DCI is used to schedule the downlink data which is to be transmitted by the base station to the terminal; and transmitting, by the base station, the downlink data to the terminal through the second antenna panel, wherein the first antenna panel and the second antenna panel are the same antenna panel, so that the terminal receives the downlink data by using a default receiving beam in response to a time interval between receiving the first DCI and the downlink data is less than a preset time period, wherein the default receiving beam is a receiving beam used by the terminal for receiving a second PDCCH through the second antenna panel.

According to a third aspect of the present disclosure, a device for receiving downlink data is provided. The device is applied to a terminal, and includes a processor and a memory configured to store instructions executable by the processor. Further, the processor is configured to implement the method according to the first aspect.

According to a fourth aspect of the present disclosure, a device for transmitting downlink data is provided. The device is applied to a base station, and includes a processor and a memory configured to store instructions executable by the processor. Further, the processor is configured to implement the method according to the second aspect.

It should be understood that both the above general description and the following detailed description are exemplary and explanatory only and are not restrictive of the disclosure.

BRIEF DESCRIPTION OF THE DRAWINGS

The drawings herein are incorporated into the specification and constitute a part of the specification, show embodiments in conformity with the present disclosure, and explain the principle of the present disclosure together with the specification.

DETAILED DESCRIPTION

Reference will now be made in detail to exemplary embodiments, examples of which are illustrated in the accompanying drawings. When the following description refers to the accompanying drawings, the same numbers in different drawings represent the same or similar elements, unless otherwise represented. The implementations described in the following exemplary embodiments do not represent all implementations consistent with the present disclosure. On the contrary, they are only examples of devices and methods consistent with some aspects of the present disclosure as detailed in the appended claims.

The network architecture and business scenarios described in embodiments of the present disclosure are intended to more clearly explain technical solutions of embodiments of the present disclosure, and does not constitute limitation on the technical solutions provided by embodiments of the present disclosure. Ordinary technicians in the field know that, with the evolution of network architecture and the emergence of new business scenarios, the technical solutions provided in embodiments of the present disclosure are equally applicable to similar technical problems.

Figure 1:
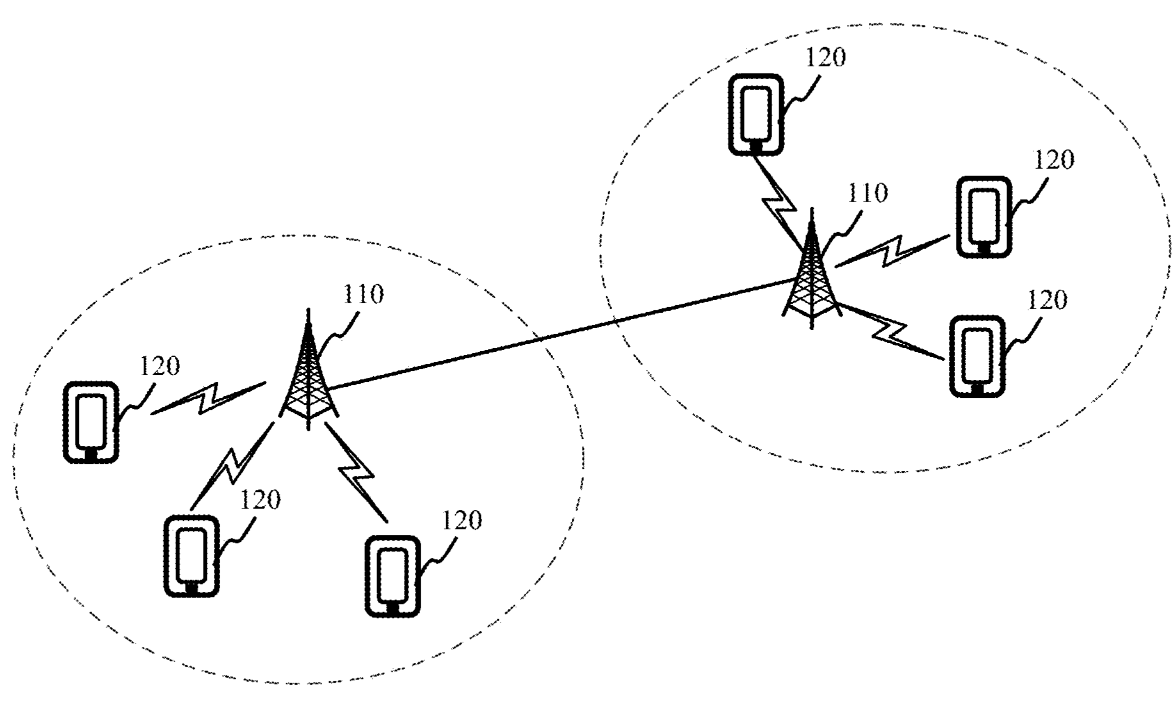
FIG. 1 is a schematic diagram of a network architecture illustrated according to an exemplary embodiment.

FIG. 1 is a schematic diagram of a network architecture illustrated according to an exemplary embodiment. This network architecture may include base stations 110 and terminals 120.

The base station 110 is deployed in an access network. The access network in 5G NR system may be called NG-RAN (New Generation-Radio Access Network). The base station 110 and terminal 120 communicate with each other through some kind of air interface technology, for example through cellular technology.

The base station 110 is a device deployed in the access network to provide wireless communication function for the terminal 120. The base station 110 may include various forms of macro base station, micro base station, relay station, access point, etc. In systems with different wireless access technologies, the names of the devices that function as base stations may vary, such as gNodeB or gNB in 5G NR systems. As communications technology evolves, the term "base station" may change. For the convenience of description, in embodiments of the present disclosure, the above devices providing wireless communication function for the terminal 120 are collectively referred to as base stations.

The number of terminals 120 is usually more than one. One or more terminals 120 may be distributed in the cell managed by each base station 110. Terminals 120 may include various handheld devices, vehicle-mounted devices, wearable devices, computing devices or other processing devices connected to wireless modems that have wireless communication functions, as well as various forms of user equipment (UE), mobile station (MS), terminal devices and so on. For convenience of description, in embodiments of the present disclosure, the devices mentioned above are collectively referred to as terminals.

The "5G NR system" in embodiments of the present disclosure may also be referred to as a 5G system or NR system, but the meaning thereof may be understood by technicians in the field. The technical solutions described in embodiments of the present disclosure may be applicable to a 5G NR system or to a subsequent evolution of a 5G NR system.

As mentioned above, in 5G NR system, the base station and the terminal may use beams to transmit and receive information. For downlink transmission, the base station may use the beam to transmit DCI and downlink data to the terminal. DCI is transmitted through PDCCH, and downlink data is transmitted through PDSCH (Physical Downlink Shared Channel).

The terminal may determine the receiving beam of the DCI in the following way. The base station notifies the terminal of at least one TCI (Transmission Configuration Indication) state through RRC (Radio Resource Control) signaling. The TCI state includes TCI state identification and the corresponding RS (Reference Signal) type and RS identification. If the RRC signaling notifies multiple TCI states, then the base station activates one of the above TCI states using MAC (Medium Access Control) signaling. The activated TCI state is the transmission state configuration of PDCCH given by the base station to the terminal. That is, the base station notifies the terminal to receive the DCI on the PDCCH using the same receiving beam as receiving the RS corresponding to the TCI state. The terminal may then receive the DCI on the PDCCH using the receiving beam determined above.

The terminal may determine the receiving beam of downlink data by the following way. The base station notifies the terminal of multiple TCI states through RRC signaling. The base station then uses MAC signaling to activate some of the above TCI states (e.g., up to 8 TCI states), and then notifies the terminal via DCI which one of the above activated TCI states is used for PDSCH (Physical Downlink Shared Channel). The physical downlink shared channel is which of the above several TCI states are activated. The TCI state informed by DCI is the transmission state configuration of PDSCH given by the base station to the terminal, that is, the receiving beam used by the terminal when receiving downlink data on PDSCH should be the same as the receiving beam used by the terminal when receiving RS corresponding to the TCI state. The terminal may then receive downlink data on PDSCH using the receiving beam determined above. In other words, before the base station transmits downlink data to the terminal through PDSCH, it will first transmit one DCI (denoted as "the first DCI") to the terminal through PDCCH. The first DCI is configured to schedule the downlink data that the base station will transmit to the terminal, such as indicating the location of the time-frequency resource corresponding to the downlink data, the target receiving beam and other information.

When the base station has only one antenna panel, the base station has only one beam direction when performing downlink transmission. The base station may configure multiple CORESETs to the terminal for transmitting PDCCH. Among them, respective CORESETs come from the same antenna panel, and the PDCCH transmitted by respective CORESETs may correspond to different TCI states. When the terminal cannot determine the target receiving beam for receiving downlink data according to the first DCI, the terminal uses the default receiving beam to receive downlink data. The default receiving beam is a receiving beam corresponding to a CORESET with a smallest number in the CORESETs used by PDCCHs received by the terminal in a latest scheduling unit (for example, the latest slot).

When the base station has multiple antenna panels, if communication between multiple antenna panels is not an ideal backhaul, there will be a large delay in the interactive communication between multiple antenna panels. In this case, multiple antenna panels independently transmit PDCCH to the terminal to independently carry out PDSCH scheduling. At this time, when the terminal cannot determine the target receiving beam for receiving downlink data according to the first DCI, if the receiving beam corresponding to the CORESET with the smallest number in the CORESETS used by PDCCHs received by the terminal in the latest scheduling unit is still taken as the default receiving beam, the receiving beam corresponding to the CORESET with the smallest number may not match the transmitting beam for transmitting the downlink data, resulting in an error in receiving downlink data by the terminal. For example, a PDCCH transmitted with the smallest number of CORESET is transmitted through antenna panel 1, while downlink data is transmitted through antenna panel 2. If the terminal receives downlink data transmitted through antenna panel 2 using the same receiving beam that it used to receive a PDCCH transmitted through antenna panel 1, the downlink data will not be received successfully.

In the technical solutions provided by the present disclosure, after the terminal receives the first DCI carried by the first PDCCH sent by the base station through the first antenna panel and configured to schedule downlink data transmitted by the base station to the terminal, if the terminal cannot determine the target receiving beam for receiving the downlink data according to the first DCI, the terminal selects the default receiving beam for receiving the downlink data, in which, the default receiving beam is the receiving beam used by the terminal for receiving the second PDCCH through the same antenna panel as the downlink data. The technical solution provided in this disclosure embodiment takes the receiving beam used for receiving the second PDCCH through the same antenna panel with the downlink data as the default receiving beam, thus providing an accurate default receiving beam for receiving downlink data, thus improving the accuracy of receiving downlink data by the terminal. In the following, several embodiments will be used to introduce the technical solutions provided by the present disclosure.

Figure 2:
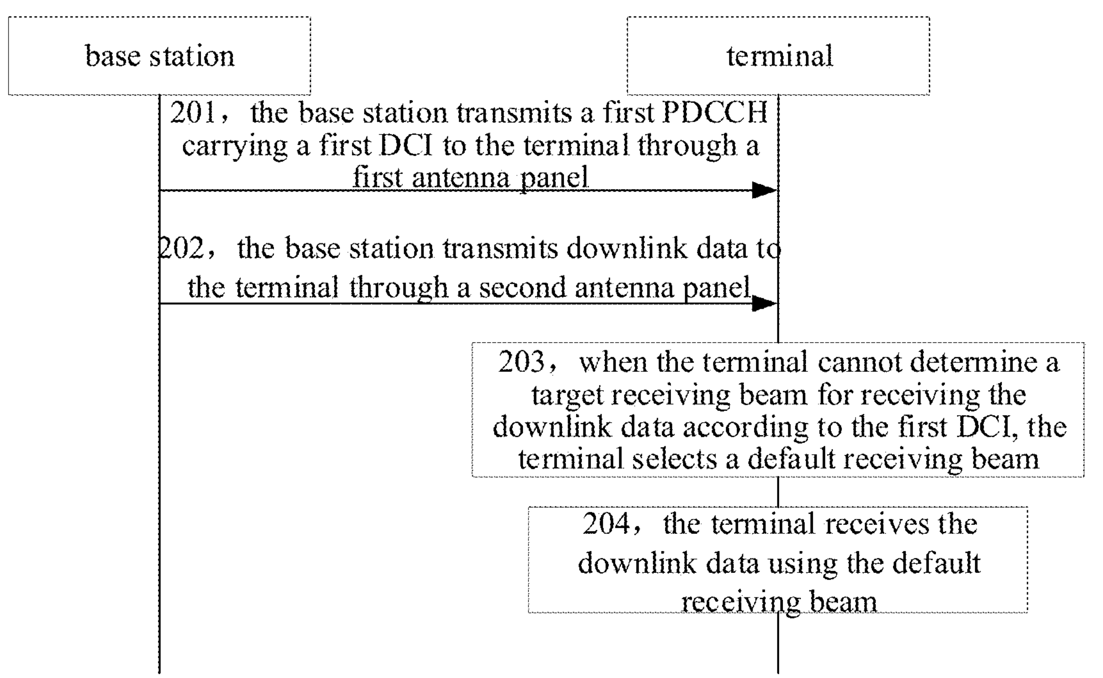
FIG. 2 is a schematic diagram illustrating a method for receiving downlink data according to an exemplary embodiment.

FIG. 2 is a schematic diagram illustrating a method for receiving downlink data according to an exemplary embodiment. This method may be applied to the network architecture shown in FIG. 1. The method may include the following steps (201~204).

At step 201, a base station transmits a first PDCCH to a terminal through a first antenna panel, the first PDCCH carrying a first DCI.

In embodiments of the present disclosure, the base station has multiple antenna panels through which the base station may transmit DCI and downlink data to the terminal. The above multiple antenna panels may belong to the same TRP (Transmitter Receiver Point), or to several different TRPs. That is, one base station may have one or more TRPs, each TRP may have one or more antenna panels, and different antenna panels corresponds to different beam directions.

In embodiments of the present disclosure, the first DCI is configured to schedule downlink data transmitted by the base station to the terminal. The first DCI is configured to indicate how the terminal receives downlink data, for example, indicate the location of the time-frequency resource corresponding to the downlink data, the target receiving beam and other information.

Optionally, the first DCI carries receiving beam indication information configured to indicate the target receiving beam used for receiving the downlink data. For example, the receiving beam indication information is in a TCI state. When the TCI state is included in the first DCI, the base station informs the terminal the TCI state for scheduling PDSCH through the first DCI, that is, when the terminal receives downlink data on PDSCH, the receiving beam used shall be the same as the receiving beam used for receiving the RS corresponding to the TCI state. The terminal may then use the target receiving beam determined above to receive downlink data carried by the PDSCH. Of course, in some other possible cases, the first DCI may not include the receiving beam indication information, for example, may only include time-frequency resource indication information, which is configured to indicate the location of time-frequency resource corresponding to the downlink data.

At step 202, the base station transmits downlink data to the terminal through a second antenna panel.

The first antenna panel and the second antenna panel are the same antenna panel. Alternatively, the first antenna panel and the second antenna panel are two different antenna panels. In other words, the base station may use the same antenna panel to transmit the first DCI and the downlink data, or may use two different antenna panels to transmit the first DCI and the downlink data respectively.

The above downlink data may be service data, which refers to service-related data. For different service, the content of service data may be different.

At step 203, when the terminal cannot determine a target receiving beam for receiving the downlink data according to the first DCI, the terminal selects a default receiving beam.

When the receiving beam indication information is not included in the first DCI, that is, after receiving the first DCI, the terminal cannot parse out the target receiving beam for receiving the downlink data carried by PDSCH from the first DCI, the terminal may select the default receiving beam.

In addition, when the time interval between receiving the first DCI and the downlink data is less than a preset time period, the terminal has no time to analyze the receiving beam indication information in the first DCI, and the terminal cannot determine the target receiving beam for receiving the downlink data, then the terminal may select the default receiving beam.

The above default receiving beam is the receiving beam used by the terminal for receiving the second PDCCH through the same antenna panel as the downlink data. For example, the base station has the following two antenna panels: Panel #0 and Panel #1. The base station transmits downlink data to the terminal through Panel #1, and the base station also transmits the second PDCCH to the terminal through this Panel #1. Then the terminal selects the receiving beam used for receiving the second PDCCH as the default receiving beam.

Optionally, after receiving the first DCI carried by the first PDCCH, if the terminal cannot determine the target receiving beam for receiving downlink data according to the first DCI, the terminal first determines the second antenna panel used by the base station to send downlink data, and then determines the default receiving beam according to the second antenna panel. The default receiving beam is the receiving beam used by the terminal for receiving the second PDCCH from the second antenna panel. In embodiments of the present disclosure, there is no restriction on the mode in which the terminal determines the second antenna panel used by the base station to transmit downlink data. For example, the terminal may determine the second antenna panel used by the base station to transmit downlink data according to the CORESET configuration information, or may determine the second panel used by the base station to transmit downlink data from the information carried by the first DCI. An explanation of the above two modes may be found in embodiments below.

At step 204, the terminal receives the downlink data using the default receiving beam.

After determining the default receiving beam, the terminal may use the default receiving beam to receive the downlink data transmitted by the base station. Since the default receiving beam has received the information through the second antenna panel, there is no error when the default receiving beam is used to receive the downlink data through the second antenna panel, which can ensure the accurate receiving of the downlink data.

In summary, in the technical solutions provided by the present disclosure, after the terminal receives the first DCI carried by the first PDCCH sent by the base station through the first antenna panel and configured to schedule downlink data transmitted by the base station to the terminal, if the terminal cannot determine the target receiving beam for receiving the downlink data according to the first DCI, the terminal selects the default receiving beam for receiving the downlink data, in which, the default receiving beam is the receiving beam used by the terminal for receiving the second PDCCH through the same antenna panel as the downlink data. The technical solution provided in this disclosure embodiment takes the receiving beam used for receiving the second PDCCH through the same antenna panel with the downlink data as the default receiving beam, thus providing an accurate default receiving beam for receiving downlink data, thus improving the accuracy of receiving downlink data by the terminal.

If the DCI carried by the PDCCH sent through an antenna panel can only schedule the resources of the antenna panel to transmit downlink data, but cannot schedule the resources of other antenna panels to transmit downlink data, the terminal may determine the default receiving beam by using the method described in the embodiment in FIG. 3 below.

Figures 3, 4:
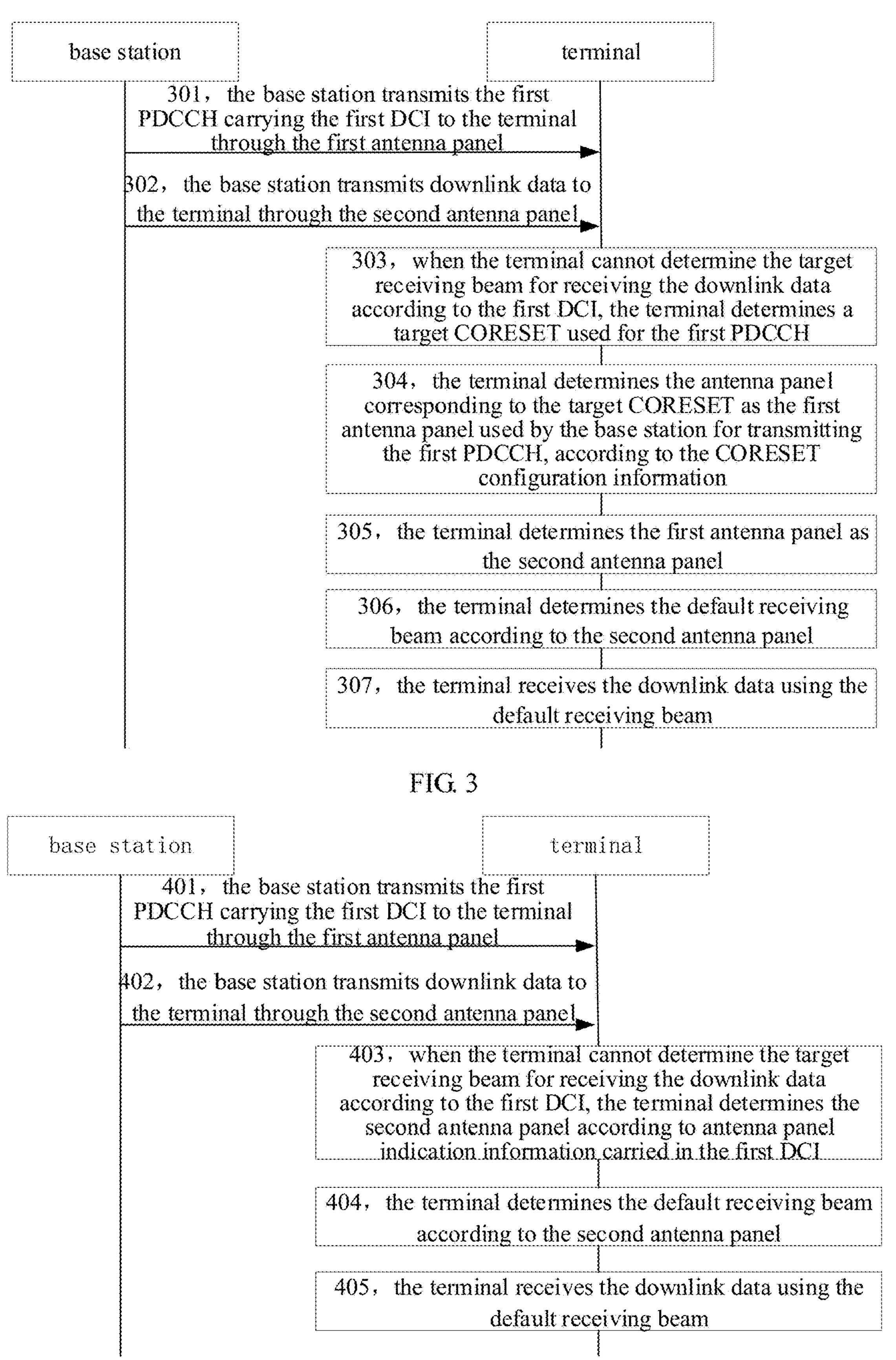
FIG. 3 is a schematic diagram illustrating a method for receiving downlink data according to another exemplary embodiment.
FIG. 4 is a schematic diagram illustrating a method for receiving downlink data according to another exemplary embodiment.

FIG. 3 is a schematic diagram illustrating a method for receiving downlink data according to another exemplary embodiment. This method may be applied to the network architecture shown in FIG. 1. The method may include the following steps (301~307).

At step 301, the base station transmits the first PDCCH to the terminal through the first antenna panel, the first PDCCH carrying the first DCI.

The first DCI is configured to schedule the base station to transmit downlink data to the terminal.

At step 302, the base station transmits downlink data to the terminal through the second antenna panel.

In this embodiment, since the first DCI transmitted through the first antenna panel can only schedule resources of the first antenna panel for transmitting downlink data, the first antenna panel and the second antenna panel are the same antenna panel. For example, the base station has the following two antenna panels: Panel #0 and Panel #1. The base station transmits the first DCI to the terminal through Panel #0, and then transmits downlink data to the terminal through this Panel #0.

At step 303, when the terminal cannot determine the target receiving beam for receiving the downlink data according to the first DCI, the terminal determines a target CORESET used for the first PDCCH.

The base station may configure a plurality of CORESETs for the terminal to transmit PDCCH, and the CORESET contains time-frequency resources and other information used to transmit PDCCH. After the base station configuring the terminal with CORESETs, the base station may send the CORESET configuration information to the terminal. The CORESET configuration information may include the number (i.e. ID) of each CORESET configured by the base station to the terminal. The number of the CORESET is used to uniquely identify the CORESET, and different CORESETs have different numbers.

After receiving the first PDCCH, the terminal may determine which CORESET is used by the base station for transmitting the first PDCCH according to the location of time-frequency resource occupied by the first PDCCH, that is, determine the target CORESET used for the first PDCCH.

At step 304, the terminal determines the antenna panel corresponding to the target CORESET as the first antenna panel used by the base station for transmitting the first PDCCH, according to the CORESET configuration information.

In this embodiment, the CORESET configuration information includes the identification information of the antenna panel using the CORESET for PDCCH transmission. The identification information of the antenna panel is used to uniquely identify the antenna panel, and different antenna panels have different identification information.

Optionally, the CORESET configuration information includes at least one set of correspondence between a CORESET and an antenna panel. As an example, suppose that the base station has configured three CORESETs for transmitting PDCCH to the terminal, namely CORESET #0, CORESET #1, and CORESET #2, then the CORESET configuration information transmitted by the base station to the terminal may include the following: {CORESET #0, Panel #0}, {CORESET #1, Panel #1} and {CORESET #2, Panel #0}. The above CORESET configuration information indicates that Panel #0 transmits PDCCH to the terminal using CORESET #0 and CORESET #2, and Panel #1 transmits PDCCH to the terminal using CORESET #1. When the terminal receives the first PDCCH, assuming that the terminal determines that the first PDCCH is transmitted by CORESET #2 based on the CORESET configuration information, the terminal can further determine that the first PDCCH is transmitted through Panel #0.

At step 305, the terminal determines the first antenna panel as the second antenna panel.

In this embodiment, since the first DCI carried by the first PDCCH transmitted through the first antenna panel can only schedule resources of the first antenna panel for transmitting downlink data, the first antenna panel used to transmit the first PDCCH and the second antenna panel used to transmit downlink data are the same antenna panel. Therefore, after the first antenna panel is determined by the terminal, the first antenna panel may be determined as the second antenna panel used by the base station for transmitting downlink data. Again, using the above example, after the terminal determines that the first PDCCH is transmitted through Panel #0, the terminal determines that the second antenna panel used by the base station for transmitting downlink data is also Panel #0.

At step 306, the terminal determines the default receiving beam according to the second antenna panel.

The above default receiving beam is the receiving beam used by the terminal for receiving the second PDCCH through the second antenna panel. Optionally, the second PDCCH is a PDCCH received in a latest scheduling unit transmitted through the second antenna panel, using a CORESET with a smallest number in CORESETs by which the PDCCH is transmitted through the second antenna panel. The above scheduling unit may be the smallest scheduling unit in time domain. For example, one scheduling unit is one slot or one mini-slot.

Again, using the above example, after the terminal determines that the antenna panel used by the base station to transmit downlink data is Panel #0, the terminal needs to find the second PDCCH transmitted through Panel #0 by the CORESET with the smallest number of the CORESETs by which PDCCHs are transmitted through Panel #0 in the last scheduling unit. If in the latest scheduling unit, all PDCCHs received through Panel #0 are transmitted by CORESET #2, then the terminal determines the PDCCH transmitted through the Panel #0 by CORESET #2 as the second PDCCH, and takes the receiving beam for receiving the second PDCCH as the default receiving beam. If in the latest scheduling unit, all PDCCHs received through Panel #0 are transmitted by CORESET #0, the terminal determines the PDCCH transmitted through the Panel #0 by CORESET #0 as the second PDCCH, and takes the receiving beam for receiving the second PDCCH as the default receiving beam. If in the latest scheduling unit, all PDCCHs received through Panel #0 are transmitted by CORESET #0 and CORESET #2, the terminal determines the PDCCH transmitted through Panel #0 by CORESET #0 as the second PDCCH, and takes the receiving beam for receiving the second PDCCH as the default receiving beam.

At step 307, the terminal receives the downlink data using the default receiving beam.

After determining the default receiving beam, the terminal may use the default receiving beam to receive the downlink data transmitted by the base station. Since the default receiving beam has received the information from the second antenna panel, there is no error when the default receiving beam is used to receive the downlink data from the second antenna panel, which can ensure the accurate receiving of the downlink data.

In summary, in the technical solution provided in this embodiment, when the DCI carried on the PDCCH transmitted through a certain antenna panel can only schedule the resources of the antenna panel to transmit downlink data, the CORESET configuration information transmitted by the base station to the terminal may include the identification information of the antenna panel using CORESET for PDCCH transmission. In this way, the terminal can determine the antenna panel used by the base station to send downlink data according to the CORESET configuration information, and then select the accurate default receiving beam to receive downlink data, so as to improve the accuracy of the terminal receiving downlink data.

If the DCI carried by the PDCCH transmitted through a certain antenna panel can schedule resources of the antenna panel to transmit downlink data as well as resources of other antenna panels to transmit downlink data, then the terminal may determine the default receiving beam by using the method described in the embodiment in FIG. 4 below.

FIG. 4 is a schematic diagram illustrating a method for receiving downlink data according to another exemplary embodiment. This method may be applied to the network architecture shown in FIG. 1. The method may include the following steps (401~405).

At step 401, the base station transmits the first PDCCH to the terminal through the first antenna panel, the first PDCCH carrying the first DCI.

The first DCI is configured to schedule downlink data transmitted by the base station to the terminal.

At step 402, the base station transmits downlink data to the terminal through the second antenna panel.

In this embodiment, since it is possible for the first DCI transmitted through the first antenna panel to schedule resources of other antenna panels to transmit downlink data, the first antenna panel and the second antenna panel may be two different antenna panels. For example, the base station has the following two antenna panels: Panel #0 and Panel #1. The base station transmits the first DCI to the terminal through Panel #0. The first DCI is configured to schedule Panel #1 to transmit downlink data to the terminal, and then the base station transmits downlink data to the terminal through Panel #1. The above mentioned first antenna panel and second antenna panel may belong to the same TRP or may belong to two different TRPs, which is not limited by embodiments of the present disclosure.

At step 403, when the terminal cannot determine the target receiving beam for receiving the downlink data according to the first DCI, the terminal determines the second antenna panel according to antenna panel indication information in the first DCI.

The antenna panel indication information is configured to indicate the second antenna panel used by the base station to transmit downlink data. The terminal can directly know the second antenna panel used by the base station to transmit downlink data according to the antenna panel indication information in the first DCI.

Compared with the embodiment in FIG. 3, since in this embodiment, the first antenna panel and the second antenna panel may be two different antenna panels, the terminal cannot directly determine the second antenna panel used by the base station to transmit downlink data according to the CORESET configuration information. In this embodiment, the antenna panel indication information is carried in the first DCI, so that based on this, the terminal learns the second antenna panel used by the base station to transmit downlink data.

At step 404, the terminal determines the default receiving beam according to the second antenna panel.

The above default receiving beam is the receiving beam used by the terminal for receiving the second PDCCH through the second antenna panel. Optionally, the second PDCCH is the PDCCH transmitted through the second antenna panel by the CORESET with the smallest number in the CORESETs by which PDCCHs are transmitted in the latest scheduling unit through the second antenna panel. The above scheduling unit may be the smallest scheduling unit in time domain. For example, one scheduling unit is one slot or one min-slot.

As an example, suppose that the base station has configured three CORESET for transmitting PDCCH to the terminal, namely CORESET #0, CORESET #1, and CORESET #2, then the CORESET configuration information transmitted by the base station to the terminal may include the following: {CORESET #0, Panel #0}, {CORESET #1, Panel #1} and {CORESET #2, Panel #0}. The above CORESET configuration information indicates that Panel #0 transmits PDCCH to the terminal using CORESET #0 and CORESET #2, and Panel #1 transmits PDCCH to the terminal using CORESET #1. Assuming that after receiving the DCI carried by the first PDCCH, the terminal determines according to the antenna panel indication information in the first DCI that the second antenna panel transmitting the downlink data is Panel #0, then the terminal needs to find the second PDCCH transmitted through Panel #0 by the CORESET with the smallest number of CORESETs by which the PDCCHs are transmitted in the latest scheduling unit through Panel #0. If in the latest scheduling unit, all PDCCHs are transmitted using by CORESET #2 through Panel #0, then the terminal determines the PDCCH transmitted through the Panel #0 using CORESET #2 as the second PDCCH, and takes the receiving beam for receiving the second PDCCH as the default receiving beam. If in the latest scheduling unit, all PDCCHs are transmitted through Panel #0 by CORESET #0, the terminal determines the PDCCH transmitted through the Panel #0 by CORESET #0 as the second PDCCH, and takes the receiving beam for receiving the second PDCCH as the default receiving beam. If in the latest scheduling, all PDCCHs are transmitted through Panel #0 by CORESET #0 and CORESET #2, the terminal determines the PDCCH transmitted through Panel #0 by CORESET #0 as the second PDCCH, and takes the receiving beam for receiving the second PDCCH as the default receiving beam.

At step 405, the terminal receives the downlink data using the default receiving beam.

After determining the default receiving beam, the terminal may use the default receiving beam to receive the downlink data transmitted by the base station. Since the default receiving beam has received the information from the second antenna panel, there is no error when the default receiving beam is used to receive the downlink data from the second antenna panel, which can ensure the accurate receiving of the downlink data.

In summary, in the technical solution provided by this embodiment, when the DCI carried by the PDCCH transmitted through a certain antenna panel can schedule resources of the antenna panel to transmit downlink data as well as resources of other antenna panels to transmit downlink data, the base station may carry the antenna panel indication information in the DCI transmitted to the terminal, to indicate the antenna panel used by the base station for transmitting downlink data, so that the terminal determines the accurate default receiving beam for receiving downlink data, thereby improving the accuracy of the terminal receiving the downlink data.

It is to be noted that, in some other cases, if the DCI carried by the PDCCH transmitted through a certain antenna panel can only schedule resources of this antenna panel to transmit downlink data, but cannot schedule resources of other antenna panels to transmit downlink data, the base station may also carry the antenna panel indication information in the DCI transmitted to the terminal, to indicate the antenna panel used by the base station to transmit downlink data, so that the terminal does not have to determine the antenna panel used by the base station to transmit downlink data based on the CORESET configuration information.

In addition, if the DCI carried by the PDCCH transmitted through a certain antenna panel can only schedule the resources of the antenna panel to transmit downlink data, but cannot schedule the resources of other antenna panels to transmit downlink data, the terminal may also use the method described in the embodiment in FIG. 5 below to determine the default receiving beam.

Figure 5:
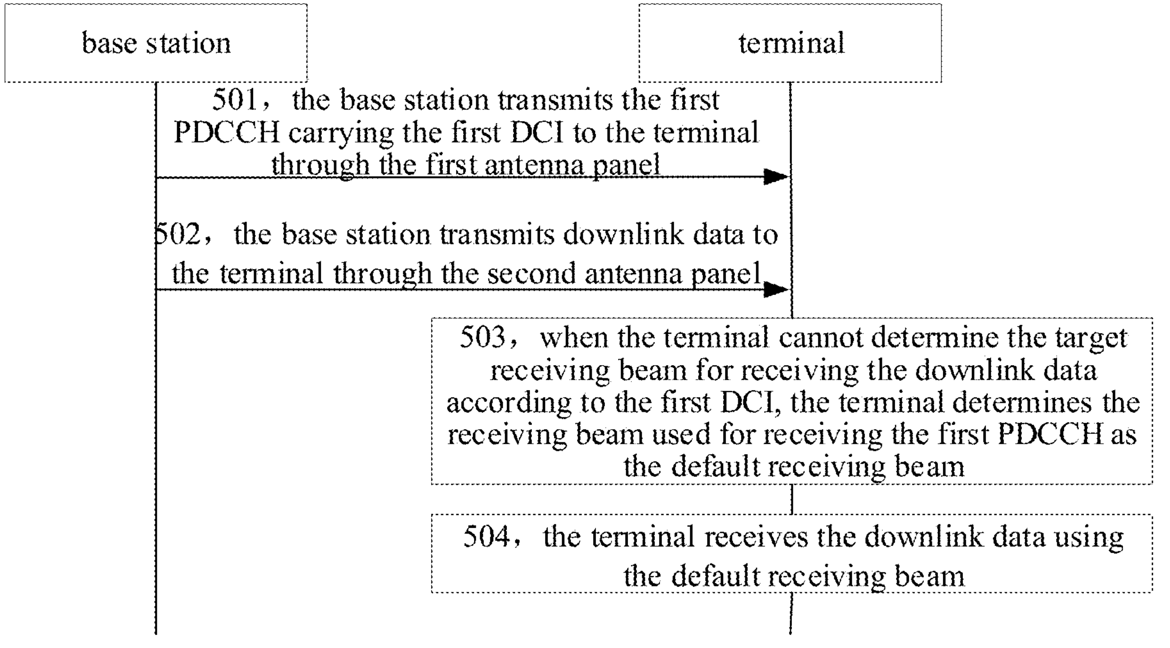
FIG. 5 is a schematic diagram illustrating a method for receiving downlink data according to another exemplary embodiment.

FIG. 5 is a schematic diagram illustrating a method for receiving downlink data according to another exemplary embodiment. This method may be applied to the network architecture shown in FIG. 1. The method may include the following steps (501~504).

At step 501, the base station transmits the first PDCCH to the terminal through the first antenna panel, the first PDCCH carrying the first DCI.

The first DCI is configured to schedule downlink data transmitted by the base station to the terminal.

At step 502, the base station transmits downlink data to the terminal through the second antenna panel.

In this embodiment, since the first DCI transmitted through the first antenna panel can only schedule resources of the first antenna panel to transmit downlink data, the first antenna panel and the second antenna panel are the same antenna panel. For example, the base station has the following two antenna panels: Panel #0 and Panel #1. The base station transmits the first DCI to the terminal through Panel #0, and then transmits downlink data to the terminal through this Panel #0.

At step 503, when the terminal cannot determine the target receiving beam for receiving the downlink data according to the first DCI, the terminal determines the receiving beam used for receiving the first PDCCH as the default receiving beam.

In this embodiment, since the second antenna panel for the base station to transmit downlink data is the same antenna panel as the first antenna panel for the base station to transmit the first PDCCH, the terminal can directly use the receiving beam used to receive the first PDCCH as the default receiving beam.

As an example, suppose that the base station has configured a terminal with three CORESETs for transmitting PDCCH, namely CORESET #0, CORESET #1, and CORESET #2. In this case, when the terminal receives the first PDCCH from CORESET #2, the terminal directly uses the receiving beam for receiving the first PDCCH as the default receiving beam for receiving downlink data.

At step 504, the terminal receives the downlink data using the default receiving beam.

After determining the default receiving beam, the terminal may use the default receiving beam to receive the downlink data transmitted by the base station. Since the default receiving beam has received the information from the second antenna panel, there is no error when the default receiving beam is used to receive the downlink data through the second antenna panel, which can ensure the accurate receiving of the downlink data.

In summary, in the technical solution provided in this embodiment, when the DCI carried by the PDCCH transmitted through a certain antenna panel can only schedule the resources of the antenna panel to transmit downlink data, the terminal can directly determine the receiving beam used for receiving the first PDCCH as the default receiving beam after receiving the first PDCCH sent by the base station for scheduling the downlink data, which achieves the accurate selection of the default receiving beam to receive downlink data, thus improving the accuracy of receiving downlink data.

In the above embodiments of the method, explanation is made only from the perspective of the interaction between the terminal and the base station. The above steps related to the terminal may be independently implemented as the method for receiving downlink data on the terminal side, and the above steps related to the base station may be independently implemented as the method for transmitting downlink data on the base station side.

The following is device embodiments of the present disclosure that may be configured to execute method embodiments of the present disclosure. For details not disclosed in device embodiments of this disclosure, please refer to method embodiments of this disclosure.

Figure 6:
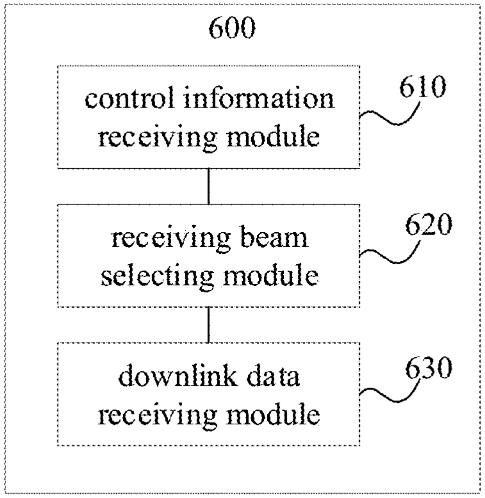
FIG. 6 is a block diagram illustrating a device for receiving downlink data according to an exemplary embodiment.

FIG. 6 is a block diagram illustrating a device for receiving downlink data according to an exemplary embodiment. The device has the function of implementing the method example on the terminal side mentioned above, which may be implemented by hardware or by hardware executing the corresponding software. The device may be a terminal described above or may be installed in a terminal. The device 600 may include a control information receiving module 610, a receiving beam selecting module 620 and a downlink data receiving module 630.

The control information receiving module 610 is configured to receive a first DCI carried by a first PDCCH transmitted by a base station through a first antenna panel, wherein the first DCI is configured to schedule downlink data transmitted by the base station to the terminal.

The receiving beam selecting module 620 is configured to select a default receiving beam when the terminal cannot determine a target receiving beam for receiving the downlink data according to the first DCI, wherein the default receiving beam is a receiving beam used by the terminal for receiving a second PDCCH through a same antenna panel as the downlink data.

The downlink data receiving module 630 is configured to receive the downlink data using the default receiving beam.

In summary, in the technical solutions provided by the present disclosure, after the terminal receives the first DCI carried by the first PDCCH sent by the base station through the first antenna panel and configured to schedule downlink data transmitted by the base station to the terminal, if the terminal cannot determine the target receiving beam for receiving the downlink data according to the first DCI, the terminal selects the default receiving beam for receiving the downlink data, in which, the default receiving beam is the receiving beam used by the terminal when receiving the second PDCCH through the same antenna panel as the downlink data. The technical solution provided in this disclosure embodiment takes the receiving beam used for receiving the second PDCCH through the same antenna panel with the downlink data as the default receiving beam, thus providing an accurate default receiving beam for receiving downlink data, thus improving the accuracy of receiving downlink data by the terminal.

Figure 7:
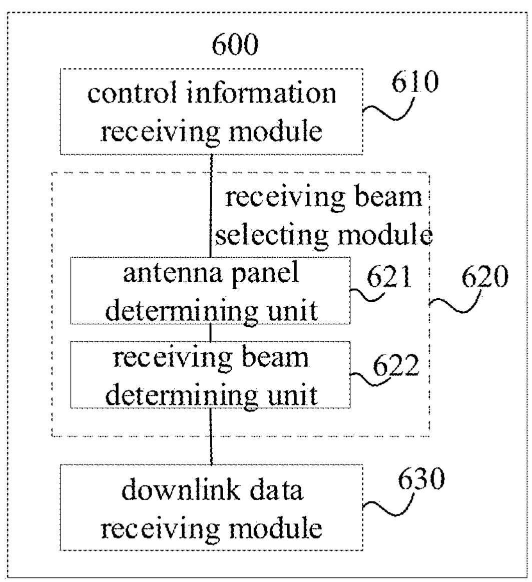
FIG. 7 is a block diagram illustrating a device for receiving downlink data according to another exemplary embodiment.

In an optional embodiment provided based on the embodiment in FIG. 6, as shown in FIG. 7, the receiving beam selecting module 620 includes an antenna panel determining unit 621 and a receiving beam determining unit 622.

The antenna panel determining unit 621 is configured to determine a second antenna panel used by the base station for transmitting the downlink data.

The receiving beam determining unit 622 is configured to determine the default receiving beam according to the second antenna panel, wherein the default receiving beam is a receiving beam used by the terminal for receiving the second PDCCH through the second antenna panel.

Optionally, the antenna panel and the second antenna panel are the same antenna panel.

The antenna panel determining unit 621 is configured to:

determine a target CORESET used for the first PDCCH;

determine an antenna panel corresponding to the target CORESET as the first antenna panel used by the base station for transmitting the first PDCCH, according to CORESET configuration information, wherein the CORESET configuration information comprises identification information of an antenna panel using a CORESET for PDCCH transmission; and determine the first antenna panel as the second antenna panel.

Optionally, the antenna panel determining unit 621 is configured to:

determine the second antenna panel according to antenna panel indication information carried in the first DCI, wherein the antenna panel indication information is configured to indicate the second antenna panel used by the base station for transmitting the downlink data.

Optionally, the second PDCCH is a PDCCH received in a latest scheduling unit transmitted through the second antenna panel, using a CORESET with a smallest number in CORESETs by which the PDCCH is transmitted through the second antenna panel.

In another optional embodiment based on the embodiment in FIG. 6 or any one of the optional embodiments above, the second antenna panel and the first antenna panel are the same antenna panel; and the receiving beam selecting module 620 is configured to:

determine a receiving beam used for receiving the first PDCCH as the default receiving beam.

Figure 8:
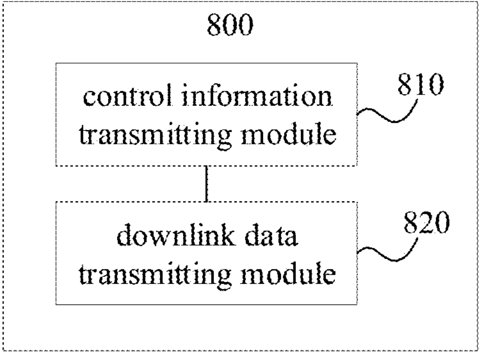
FIG. 8 is a block diagram illustrating a device for transmitting downlink data according to an exemplary embodiment.

FIG. 8 is a block diagram illustrating a device for transmitting downlink data according to an exemplary embodiment. The device has the function of implementing the method example on the base station side mentioned above, which may be implemented by hardware or by hardware executing the corresponding software. The device may be a base station described above or may be installed in a base station. The device 800 may include a control information transmitting module 810 and a downlink data transmitting module 820.

The control information transmitting module 810 is configured to transmit a first PDCCH to a terminal through a first antenna panel, the first PDCCH carrying a first DCI, the first DCI being configured to schedule downlink data transmitted by the base station to the terminal.

The downlink data transmitting module 820 is configured to transmit downlink data to the terminal through a second antenna panel, so that the terminal receives the downlink data by using a default receiving beam, wherein the default receiving beam is a receiving beam used by the terminal for receiving a second PDCCH through a same antenna panel as the downlink data.

In summary, in the technical solutions provided by the present disclosure, after the terminal receives the first DCI carried by the first PDCCH sent by the base station through the first antenna panel and configured to schedule downlink data transmitted by the base station to the terminal, if the terminal cannot determine the target receiving beam for receiving the downlink data according to the first DCI, the terminal selects the default receiving beam for receiving the downlink data, in which, the default receiving beam is the receiving beam used by the terminal when receiving the second PDCCH through the same antenna panel as the downlink data. The technical solution provided in this disclosure embodiment takes the receiving beam used for receiving the second PDCCH through the same antenna panel with the downlink data as the default receiving beam, thus providing an accurate default receiving beam for receiving downlink data, thus improving the accuracy of receiving downlink data by the terminal.

In an optional embodiment provided based on the embodiment in FIG. 8, he first antenna panel and the second antenna panel are the same antenna panel; or the first antenna panel and the second antenna panel are different antenna panels.

Figure 9:
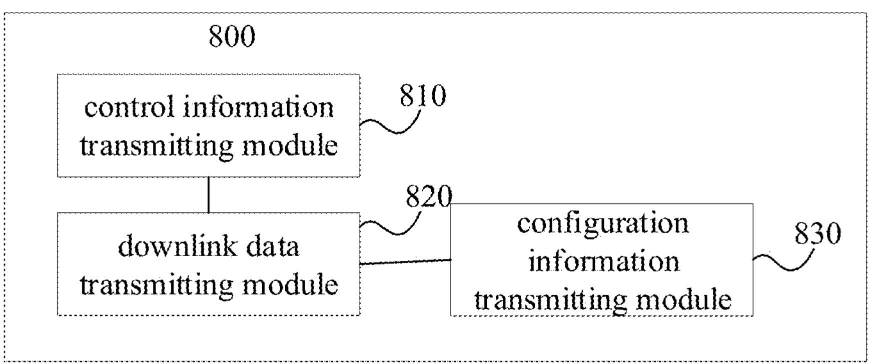
FIG. 9 is a block diagram illustrating a device for transmitting downlink data according to another exemplary embodiment.

In another optional embodiment based on the embodiment in FIG. 8 or any one of the optional embodiments above, as shown in FIG. 9, the device 800 further includes a configuration information transmitting module 830.

The configuration information transmitting module 830 is configured to transmit CORESET configuration information to the terminal, wherein the CORESET configuration information comprises identification information of an antenna panel using a CORESET for PDCCH transmission, so that the terminal determines the first antenna panel used by the base station for transmitting the first PDCCH according to the CORESET configuration information, and determines the first antenna panel as the second antenna panel.

In another optional embodiment based on the embodiment in FIG. 8 or any one of the optional embodiments above, antenna panel indication information is carried in the first DCI, and the antenna panel indication information is configured to indicate the second antenna panel used by the base station for transmitting the downlink data.

It should be noted that, when the device provided in the above embodiments implement its function, the division of the above function modules is only given as an example. In practical applications, the above functions may be allocated to different function modules according to actual requirements, that is, the content structure of the device is divided into different function modules to complete all or part of functions described above.

With regard to the device in the above embodiments, the specific way in which each module performs the operation has been described in detail in the embodiments of the method and will not be elaborated here.

The technical solution provided in embodiments of the present disclosure is introduced mainly from the perspective of interaction between the terminal and the base station. It should be understood that, the base station and the terminal include hardware structures and/or software modules that execute various functions, in order to implement the above functions. In combination with the units and algorithm steps of the examples described in embodiments of the present disclosure, the embodiments of the present disclosure may be implemented in the form of hardware or a combination of hardware and computer software. Whether a function is executed by hardware or computer software driven by hardware depends on the specific application and design constraints of the technical solution. Those skilled in the art may adopt different methods for each specific application to implement the described functions, but such implementation should not be considered as beyond the scope of the technical solutions of embodiments of the present disclosure.

An exemplary embodiment of the disclosure also provides a device for receiving downlink data, which is capable of implementing the method for receiving downlink data provided in the disclosure. The device may be a terminal described above or may be installed in a terminal. The device includes a processor and a memory configured to store instructions executable by the processor. The processor is configured to:

receive a first DCI carried on a first PDCCH sent by a base station through a first antenna panel, wherein the first DCI is configured to schedule downlink data transmitted by the base station to the terminal;

when the terminal cannot determine a target receiving beam for receiving the downlink data according to the first DCI, select a default receiving beam, wherein the default receiving beam is a receiving beam used by the terminal for receiving a second PDCCH through a same antenna panel as the downlink data; and receive the downlink data using the default receiving beam.

Optionally, the processor is further configured to:

determine a second antenna panel used by the base station for transmitting the downlink data;

determine the default receiving beam according to the second antenna panel, wherein the default receiving beam is a receiving beam used by the terminal for receiving the second PDCCH through the second antenna panel.

Optionally, the first antenna panel and the second antenna panel are the same antenna panel;

the processor is further configured to:

determine a target CORESET used for the first PDCCH;

determine an antenna panel corresponding to the target CORESET as the first antenna panel used by the base station for transmitting the first PDCCH, according to CORESET configuration information, wherein the CORESET configuration information includes identification information of an antenna panel using a CORESET for PDCCH transmitting; and determine the first antenna panel as the second antenna panel.

Optionally, the processor is further configured to:

determine the second antenna panel according to antenna panel indication information carried in the first DCI, wherein the antenna panel indication information is configured to indicate the second antenna panel used by the base station for transmitting the downlink data.

Optionally, the second PDCCH is a PDCCH received in a latest scheduling unit transmitted through the second antenna panel, using a CORESET with a smallest number in CORESETs by which the PDCCH is transmitted through the second antenna panel.

Optionally, the first antenna panel and the second antenna panel are the same antenna panel;

the processor is further configured to:

determine a receiving beam used for receiving the first PDCCH as the default receiving beam.

An exemplary embodiment of the disclosure also provides a device for transmitting downlink data, which is capable of implementing the method for transmitting downlink data provided in the disclosure. The device may be a base station described above or may be installed in a base station. The device includes a processor and a memory configured to store instructions executable by the processor. The processor is configured to:

transmit a first PDCCH to a terminal through a first antenna panel, the first PDCCH carrying a first DCI, the first DCI being configured to schedule downlink data transmitted by the base station to the terminal; and transmit downlink data to the terminal through a second antenna panel, so that the terminal receives the downlink data by using a default receiving beam, wherein the default receiving beam is a receiving beam used by the terminal for receiving a second PDCCH through a same antenna panel as the downlink data.

Optionally, the first antenna panel and the second antenna panel are the same antenna panel; or the first antenna panel and the second antenna panel are different antenna panels. Optionally, the processor is further configured to:

transmit CORESET configuration information to the terminal, wherein the CORESET configuration information includes identification information of an antenna panel using a CORESET for PDCCH transmission, so that the terminal determines the first antenna panel used by the base station for transmitting the first PDCCH according to the CORESET configuration information, and determines the first antenna panel as the second antenna panel.

Optionally, antenna panel indication information is carried in the first DCI, and the antenna panel indication information is configured to indicate the second antenna panel used by the base station for transmitting the downlink data.

Figure 10:
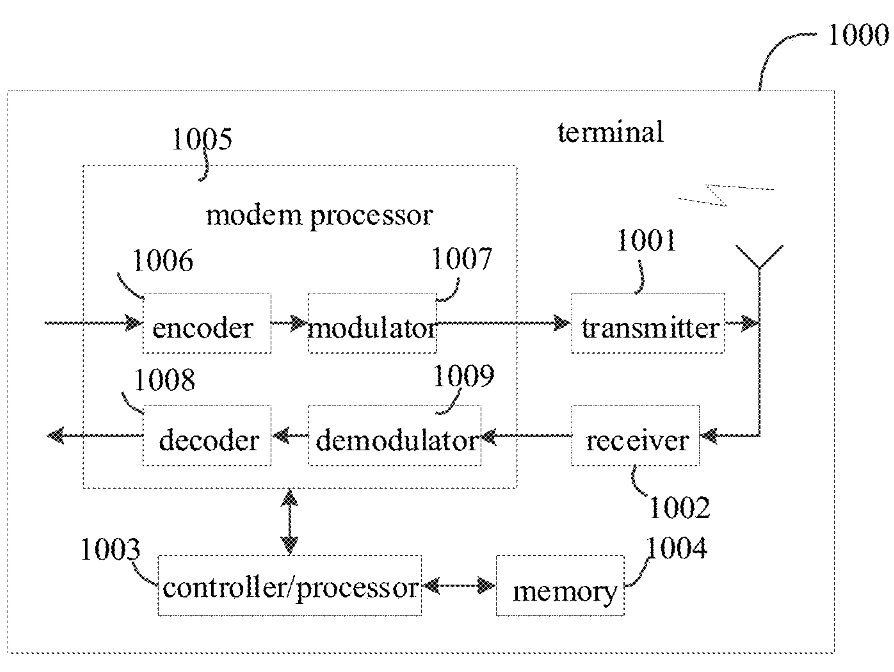
FIG. 10 is a schematic diagram illustrating a terminal according to an exemplary embodiment.

FIG. 10 is a schematic diagram illustrating a terminal according to an exemplary embodiment.

The terminal 1000 includes a transmitter 1001, a receiver 1002 and a processor 1003. The processor 1003 may also be a controller, represented as "controller/processor 1003" in FIG. 10. Optionally, the terminal 1000 may also include a modem processor 1005, in which the modem processor 1005 may include an encoder 1006, a modulator 1007, a decoder 1008 and a demodulator 1009.

In one example, the transmitter 1001 modulates (for example, performs analog conversion, filtering, amplification, and up-conversion, etc. on) this output sample and generates an uplink signal, which h is transmitted via the antenna to the base station described in the above embodiment. On the downlink, the antenna receives downlink signals transmitted by the base station in the above embodiment. The receiver 1002 modulates (for example, performs filtering, amplification, down-conversion, digitization, etc. on) the signal received from the antenna and provides input sampling. In the modem processor 1005, the encoder 1006 receives and processes (for example, formats, encodes, and interleaves) the business data and signaling messages to be sent on the uplink. The modulator 1007 further processes (for example, performs symbol mapping and modulation on) encoded business data and signaling messages and provides output sampling. The demodulator 1009 processes (for example, demodulates) this input sampling and provides symbol estimation. The decoder 1008 processes (for example, deinterleaves and decodes) the symbol estimation and provides decoded data and signaling messages sent to terminal 1000. The encoder 1006, modulator 1007, demodulator 1009, and decoder 1008 may be implemented by the composite modem processor 1005. These units are processed based on the wireless access technology used by the wireless access network (for example, LTE and other evolving systems). It should be noted that the above functions of the modem processor 1005 may also be performed by the processor 1003 when the terminal 1000 does not include the modem processor 1005.

The processor 1003 controls and manages the actions of the terminal 1000 and is configured to perform the processing process carried out by the terminal 1000 in the above embodiments of the present disclosure. For example, the processor 1003 is further configured to perform various steps of the method embodiments described above on the terminal side, and/or other steps of the technical solution described in the present embodiment.

Further, the terminal 1000 may further include a memory 1004, which is configured to store program code and data used for the terminal 1000.

It could be understood that, FIG. 10 shows only a simplified design for the terminal 1000. In practical applications, terminal 1000 may contain any number of transmitters, receivers, processors, modem processors, memories, etc., and all terminals that can implement embodiments of this disclosure are in the protection scope of embodiments of the present disclosure.

Figure 11:
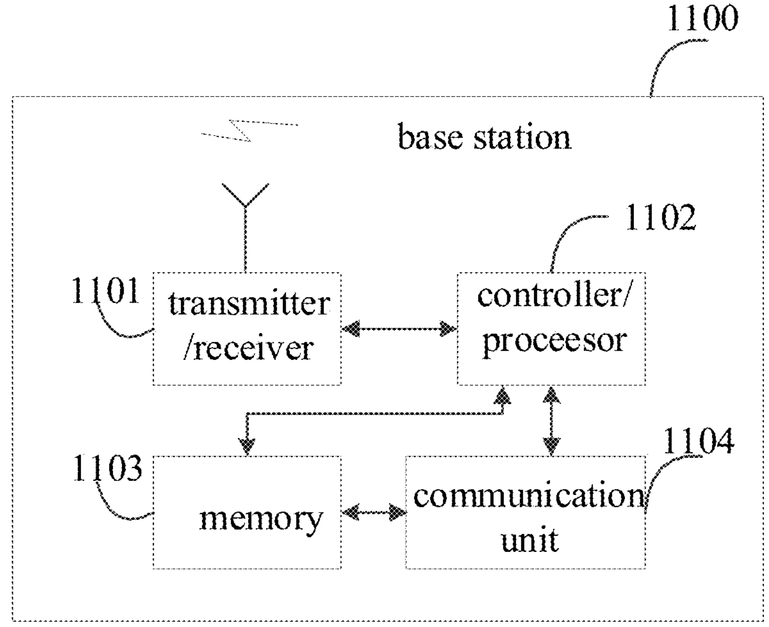
FIG. 11 is a schematic diagram illustrating a base station according to an exemplary embodiment.

FIG. 11 is a schematic diagram illustrating a base station according to an exemplary embodiment.

The base station 1100 includes a transmitter/receiver 1101 and a processor 1102. The processor 1102 may also be a controller, represented as "controller/processor 1102" in FIG. 11. The transmitter/receiver 1101 is configured to support the sending and receiving of information between the base station and the terminal in the above embodiments, and to support the communication between the base station and other network entities. The processor 1102 performs various functions for communicating with the terminal. On the uplink, the uplink signal from the terminal is received via the antenna, demodulated by the receiver 1101 (for example, demodulating the high frequency signal into a baseband signal), and further processed by the processor 1102 to recover the service data and signaling messages sent by the terminal. On the downlink, the service data and signaling messages are processed by the processor 1102 and modulated by the transmitter 1101 (for example, the baseband signal is modulated to a high-frequency signal) to generate the downlink signal, which is transmitted to the terminal via the antenna. It should be noted that the above demodulation or modulation functions may also be performed by the processor 1102. For example, the processor 1102 is further configured to perform various steps on the base station side of the above method embodiments and/or other steps of the technical solution described in embodiments of this disclosure.

Further, the base station 1100 may further include a memory 1103, which is configured to store program codes and data of the base station 1100. In addition, the base station 1100 may further include a communication unit 1104. The communication unit 1104 is configured to support the base station 1100 to communicate with other network entities (such as network equipment in the core network, etc.). For example, in a 5G NR system, the communication unit 1104 may be an NG-U interface, which is used to support the base station 1100 to communicate with UPF (User Plane Function) entities. Alternatively, the communication unit 1104 may be an NG-C interface that is used to support the base Station 1100 to communicate with AMF (Access and Mobility Management Function) entities.

It could be understood that, FIG. 11 shows only a simplified design for the base Station 1100. In practical applications, the base Station 1100 may contain any number of transmitters, receivers, processors, controllers, memories, communication units, etc., and all base stations that can implement embodiments of the present disclosure are within the protection scope of this disclosure.

Embodiment of the present disclosure also provide a non-transitory computer-readable storage medium stored thereon with computer programs that, when executed by a processor of a terminal, the method for receiving downlink data on the terminal side described above is implemented.

Embodiments of the present disclosure also provide non-transitory computer-readable storage medium stored thereon with computer programs that, when executed by a processor of a base station, the method for transmitting downlink data on the base station side described above is implemented.

The technical solutions provided by embodiments of the present disclosure may include following beneficial effects.

After receiving the first DCI configured to schedule downlink data transmitted by the base station to terminal, and carried by the first PDCCH sent by the base station through the first antenna panel, the terminal selects the default receiving beam for receiving the downlink data when the terminal cannot determine the target receiving beam for receiving the downlink data according to the first DCI, in which the default receiving beam is the receiving beam used by the terminal for receiving the second PDCCH through the same antennal as the downlink data. With the technical solutions provided by embodiments of the present disclosure, the receiving beam used by the terminal for receiving the second PDCCH through the same antennal as the downlink data is used as the default receiving beam, providing an accurate default receiving beam for receiving the downlink data, thereby improving accuracy of the terminal receiving the downlink data.

It should be understood that in this context, "multiple" refers to two or more. "And/or", which describes the association relationship of the associated objects, means that there may be three kinds of relations. For example, A and/or B may mean that A exists alone, A and B exist at the same time, and B exists alone. The character "/" generally indicates that the contextual objects is in an "OR" relationship.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for receiving downlink data, comprising:

determining, by a terminal, control resource set (CORESET) configuration information, wherein the CORESET configuration information comprises identification information of an antenna panel using a CORESET for physical downlink control channel (PDCCH) transmission;

receiving, by the terminal, a first downlink control information (DCI) carried by a first PDCCH sent by a base station through a first antenna panel in a plurality of antenna panels, wherein the first DCI is used to schedule the downlink data which is to be transmitted by the base station to the terminal;

determining, by the terminal, a second antenna panel used by the base station to transmit the downlink data, wherein the first antenna panel and the second antenna panel are the same antenna panel, wherein the terminal determines a target CORESET used for the first PDCCH, wherein the terminal determines an antenna panel corresponding to the target CORESET as the first antenna panel used by the base station for transmitting the first PDCCH according to the CORESET configuration information, and wherein the terminal determines the first antenna panel as the second antenna panel; and in response to a time interval between receiving the first DCI and the downlink data is less than a preset time period, determining, by the terminal, a default receiving beam for receiving the downlink data, wherein the default receiving beam is a receiving beam used by the terminal for receiving a second PDCCH through the second antenna panel.

2. The method of claim 1, wherein determining, by the terminal, the second antenna panel used by the base station to transmit the downlink data comprises:

determining, by the terminal, the second antenna panel according to antenna panel indication information in the first DCI, wherein the antenna panel indication information is used to indicate the second antenna panel used by the base station to transmit the downlink data.

3. The method of claim 1, wherein the second PDCCH is a PDCCH received in a latest scheduling unit of transmitted through the second antenna panel, using a CORESET with a smallest number in CORESETs by which the PDCCH is transmitted through the second antenna panel.

4. The method of claim 1, wherein determining, by the terminal, the default receiving beam for receiving the downlink data comprises:

determining, by the terminal, a receiving beam used for receiving the first PDCCH as the default receiving beam.

5. A method for transmitting downlink data, comprising:

determining, by a base station, control resource set (CORESET) configuration information, wherein the CORESET configuration information comprises identification information of an antenna panel using a CORESET for physical downlink control channel (PDCCH) transmission;

transmitting, by the base station, the CORESET configuration information to a terminal, wherein the CORESET configuration information comprises identification information of an antenna panel using a CORESET for downlink control information (DCI) transmission, wherein the terminal determines a first antenna panel used by the base station to send a first PDCCH according to the CORESET configuration information, and wherein the terminal determines the first antenna panel as a second antenna panel;

transmitting, by the base station, a first PDCCH through the first antenna panel of a plurality of antenna panels, wherein the first PDCCH carries a first DCI, and wherein the first DCI is used to schedule the downlink data which is to be transmitted by the base station to the terminal; and transmitting, by the base station, the downlink data to the terminal through the second antenna panel, wherein the first antenna panel and the second antenna panel are the same antenna panel, wherein the terminal receives the downlink data by using a default receiving beam in response to a time interval between receiving the first DCI and the downlink data is less than a preset time period, and wherein the default receiving beam is a receiving beam used by the terminal for receiving a second PDCCH through the second antenna panel.

6. The method of claim 5, wherein the first DCI carries antenna panel indication information, and wherein the antenna panel indication information is used to indicate the second antenna panel used by the base station to transmit the downlink data.

7. The method of claim 5, wherein the second PDCCH is a PDCCH received in a latest scheduling unit transmitted through the second antenna panel, using a CORESET with a smallest number in CORESETs by which the PDCCH is transmitted through the second antenna panel.

8. The method of claim 5, wherein the default receiving beam is a receiving beam used by the terminal for receiving the first PDCCH.

9. A device for receiving downlink data, applied to a terminal, comprising:

a processor; and a memory, configured to store instructions executable by the processor, wherein the processor is configured to:

determine control resource set (CORESET) configuration information, wherein the CORESET configuration information comprises identification information of an antenna panel using a CORESET for physical downlink control channel (PDCCH) transmission;

receive a first downlink control information (DCI) carried by a first PDCCH sent by a base station through a first antenna panel in a plurality of antenna panels, wherein the first DCI is configured to schedule the downlink data which is to be transmitted by the base station to the terminal;

determine a second antenna panel used by the base station to transmit the downlink data, wherein the first antenna panel and the second antenna panel are the same antenna panel, wherein the terminal determines a target CORESET used for the first PDCCH, wherein the terminal determines an antenna panel corresponding to the target CORESET as the first antenna panel used by the base station for transmitting the first PDCCH, according to the CORESET configuration information, and wherein the terminal determines the first antenna panel as the second antenna panel; and in response to a time interval between receiving the first DCI and the downlink data is less than a preset time period, determine a default receiving beam for receiving the downlink data, wherein the default receiving beam is a receiving beam used by the terminal for receiving a second PDCCH through the second antenna panel.

10. The device of claim 9, wherein the processor is configured to:

determine the second antenna panel according to antenna panel indication information in the first DCI, wherein the antenna panel indication information is used to indicate the second antenna panel used by the base station to transmit the downlink data.

11. The device of claim 9, wherein the second PDCCH is a PDCCH received in a latest scheduling unit transmitted through the second antenna panel, using a CORESET with a smallest number in CORESETs by which the PDCCH is transmitted through the second antenna panel.

12. The device of claim 9, wherein the processor is configured to:

determine a receiving beam used for receiving the first PDCCH as the default receiving beam.

13. A device for transmitting downlink data, applied to a base station, comprising:

a processor; and a memory configured to store instructions executable by the processor, wherein when the instructions are executed by the processor, the processor implements the method according to claim 5.

* * * * *